June 18, 1940.  J. E. FREEBORN  2,204,800
VARIABLE SPEED POWER TRANSMISSION APPARATUS
Filed Jan. 3, 1938  3 Sheets—Sheet 1

INVENTOR,
James Edward Freeborn,
ATTORNEY.

Patented June 18, 1940

2,204,800

UNITED STATES PATENT OFFICE 2,204,800

VARIABLE SPEED POWER TRANSMISSION APPARATUS

James Edward Freeborn, London, England, assignor to Freeborn Power Converters Limited, London, England, a British company Application January 3, 1938, Serial No. 183,164
In Great Britain January 14, 1937

3 Claims. (Cl. 74—260)

This invention relates to variable speed power transmission mechanism of the kind comprising two or more epicyclic gear trains having the driven member of one train permanently connected to the driving member of the next train of the series, each having one member which is at all times free to rotate in one sense but is prevented from rotating in the opposite sense by ratchet mechanism.

Hitherto the gear trains of such mechanism have been arranged axially in line with one another and this arrangement is entirely suitable for many purposes, for example motor vehicle transmissions. In other circumstances, however, gearing of this kind is inapplicable; for example, there may not be sufficient room in the longitudinal direction for the necessary number of gear trains, or the driven shaft may be required to be offset by a considerable distance from the driving shaft. Moreover, in some cases it may be required to apply power to either end of the driving shaft according to circumstances, and this is impossible when the gear trains are arranged axially in line.

According to the present invention the driving member of one train is connected to the driven member of the next train by toothed gearing. This enables the axes of the gear trains to be placed side by side instead of end to end, or even at an angle to one another, the toothed gearing in this case being bevel gearing.

Each gear train may consist of an internally toothed annulus constituting the driving member, planet pinions mounted on a planet carrier and a sun pinion, or it may consist of two sun pinions of different diameters and differential planet pinions. A third alternative is that in which bevel wheels are employed as driving and driven members and bevel pinions as planet members.

Figure 1:
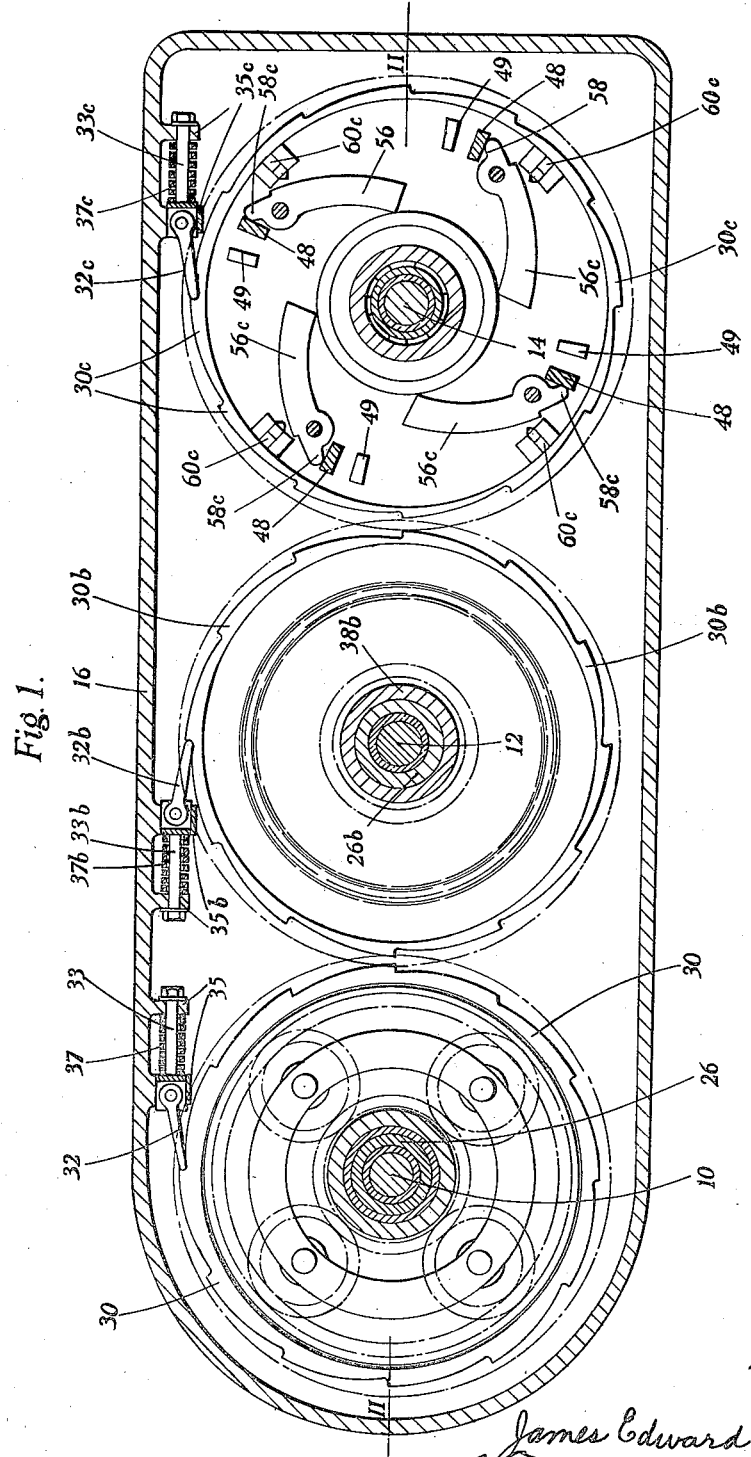
Figure 2:
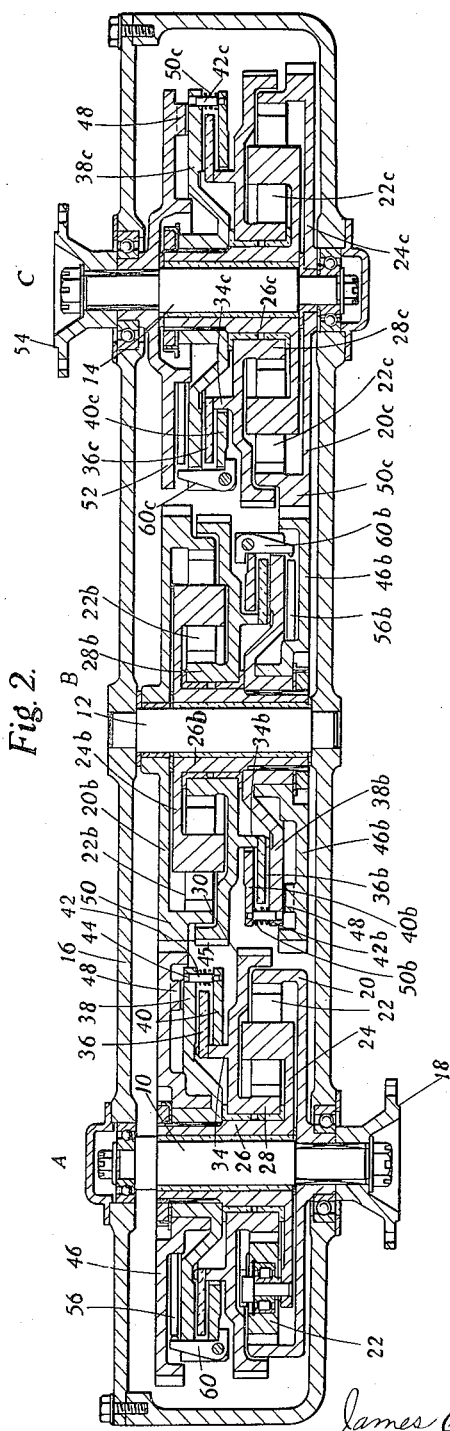
Figure 3:
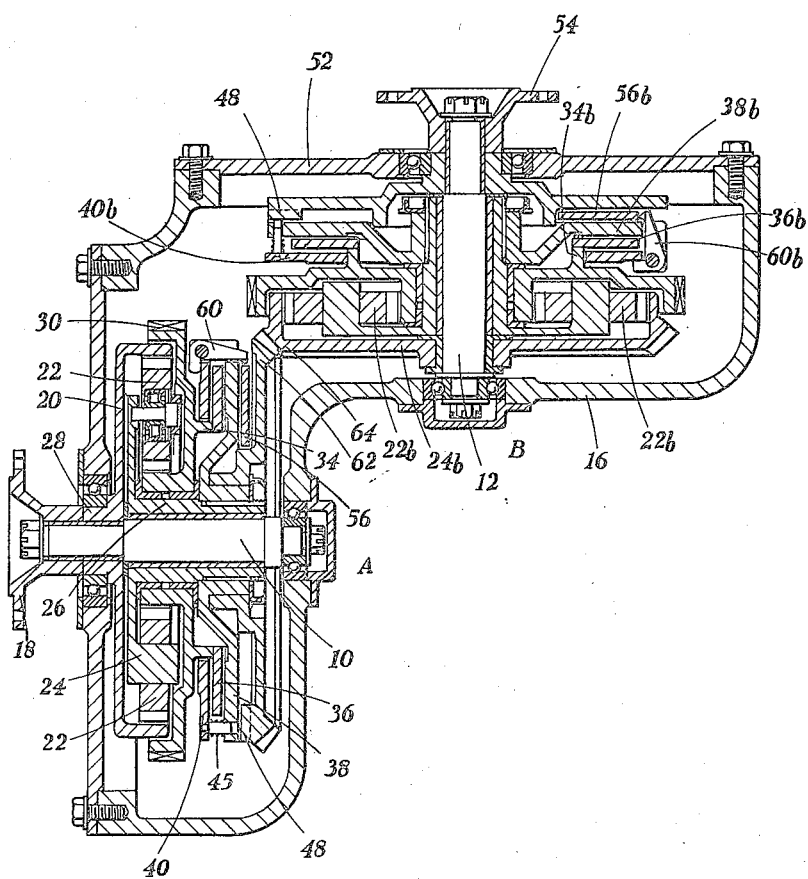

Referring to the accompanying drawings,

Figure 1 is an end elevation partly in section of one embodiment of the invention, Figure 2 is a plan in section along the line II—II in Figure 1, and Figure 3 is a plan in section of another embodiment of the invention.

Referring to Figures 1 and 2, there are three gear trains designated generally A, B and C each mounted on a separate spindle 10, 12 and 14 respectively. These three spindles are arranged side by side with their axes parallel and equally spaced and are carried in bearings in a casing 16. The three gear trains are alike in all respects although the central one B carried by the spindle 12 is reversed end for end in relation to the other two and similar reference numerals will be used for the corresponding parts of all three gear trains with the appropriate suffix b or c in the case of the gear trains B and C. The spindle 10 carries a coupling flange at one end, and also an internally toothed annulus 20 which is the driving member of the input gear train A. The internally toothed annulus meshes with planet pinions 22 carried by a planet carrier 24 mounted on a sleeve 26 free to rotate on the spindle 10. The planet pinions 22 mesh with a sun pinion 28 which is free to rotate on the sleeve 26 and which carries a ratchet wheel 30 engaged by a pawl 32 so that the ratchet wheel and therefore the sun pinion 28 is free to rotate anticlockwise as seen in Figure 1 but cannot rotate clockwise. The pawl 32 is pivoted to a rod 33 sliding in guides 35 so that it can slide against the pressure of a coil compression spring 37. This construction minimises the shock which occurs when the ratchet wheel is arrested by the pawl. The sun pinion also carries a cylindrical flange 34 which is serrated to receive internal serrations in an annular clutch plate 36, this clutch plate therefore being free to slide lengthwise of the spindle 10 upon the flange, but being held against rotation in relation to the flange.

A clutch disc 38 is splined to the sleeve 26 and a movable annular clutch plate 40 carries pins 42 which slide in holes 44 in the disc 38. Mounted on the hub of the disc 38 is a gearwheel 46 connected to the disc by a coupling indicated at 48 which will be described in detail hereinafter but which for present purposes may be regarded as a rigid connection.

In the position of the parts shown in Figure 2 the disc 38 and the clutch plates 36 and 40 are held out of contact with one another by coil compression springs 45 and there is no driving connection between the disc 38 and the sun pinion 28. If now the internally toothed annulus 20 is driven in the anticlockwise direction as seen in Figure 1 the planet carrier 24 will rotate in the same direction but at a lower speed, these planet carriers rolling round the sun pinion 28 which therefore tends to rotate in the clockwise direction. The pawl 32 engaging the teeth of the ratchet wheel 30, however, prevents the sun pinion from rotating in this direction and therefore the slower rotation of the planet carrier 24 is transmitted to the disc 38 and from this disc to the gearwheel 46.

If now the clutch plate 40 is moved towards the disc 38 the sun pinion 28 and ratchet wheel 30 will be clutched frictionally to the disc 38 and gearwheel 46. Since the disc 38 is splined to the sleeve 26 carrying the planet carrier 24, the engagement of the clutch causes all the parts of the gear train to be locked together and to rotate anticlockwise at the same speed, the teeth of the ratchet wheel 30 overrunning the pawl 32.

The gearwheel 46 meshes with an identical gearwheel 50 forming part of the internally toothed annulus 20b of the gear train B. As already stated this is identical with the gear train A and its construction need not be further described. The gearwheel 46b of this gear train meshes with an identical gearwheel 50c forming part of the internally toothed annulus 29c of the gear train C. This last gear train although identical with the other two as regards its operative parts differs from it slightly in that the gearwheel is replaced by a plain disc 52 to the hub of which is splined a coupling flange 54.

When the friction clutches of all three gear trains are disengaged each of them acts as a speed reducing gear and the speed reduction ratio of the gearbox is a maximum, the overall gear train being a product of the ratios of the individual gear trains. If the friction clutch 36c, 38c, 40c of the third gear train is engaged the gear trains A and B only are operative and the speed of the driven member 54 is increased. A further increase of speed occurs if the friction clutch of the gear train B is engaged, and finally if all three clutches which engage the whole of the epicyclic gearing will be out of action and a direct drive is obtained.

In the embodiment illustrated the three clutches are operated automatically in accordance with variations of torque and speed by mechanism such as is described in United States Patent No. 2,112,487. This mechanism is illustrated in elevation at the right-hand end of Figure 1 and in section in Figure 2. Four centrifugal levers 56 are pivoted to the disc 38. Each of them has a short extension 58 which bears upon the part 48 previously referred to which is a projection from the gearwheel 46. The gearwheel 46 is loose upon the hub of the disc 38 and it will be seen therefore that the torque between these two members is transmitted through the point of contact between the extension 58 and the projection 48. The torque reaction tends to move the centrifugal lever inwards into the position shown in Figure 1 and this action is opposed by centrifugal force. The lever 56 in swinging outwards bears upon one end of a bell crank lever 60 the other end of which bears upon the clutch plate 40.

It will be seen therefore that if the torque remains constant and the speed increases beyond a certain limit the bell crank lever 60 will be operated to engage the friction clutch 36, 38, 40 thus putting the gear train to which it belongs out of action. The same effect is produced if with a constant speed the torque diminishes below a certain value. There is thus an automatic operation of the clutch in accordance with variations of speed and torque. Assuming that all three clutches are disengaged and that either the speed increases progressively or the torque diminishes progressively, the clutch of the gear train A will be engaged first followed by that of the second train B and later by that of the third train C. If then the speed diminishes or the torque increases the clutches will be disengaged in the reverse order.

Referring now to Figure 3, the gearbox comprises two gear trains A and B which are similar in all respects to those already described. The spindles 10 and 12, however, are arranged at right angles to one another and the casing 16 is made in the appropriate angular form. The straight spur gearwheels 46, 50 of the embodiment described with reference to Figures 1 and 2 are replaced by bevel wheels 62, 64.

In both embodiments of the invention projections 49 are provided on the disc 38, each of them on the side of the corresponding projection 48 remote from the centrifugal lever 56. These projections are engaged by the projections 48 when the torque between the parts 38 and 46 (or 62) is reversed, as for example when the driven mechanism connected to the coupling flange 54 is temporarily over-running the gearing.

I claim:

1. Variable speed torque converting power transmission mechanism comprising at least two epicyclic gear trains each having a single driving member and a single driven member and means for varying its speed ratio, the axis of the driven member of one train being in the same plane as but displaced from the axis of the driving member of the other train, and toothed gearing, additional to the gearing of the gear trains themselves, connecting together said driven and driving members.

2. Variable speed torque converting power transmission mechanism comprising at least two epicyclic gear trains each having a single driving member and a single driven member and means for varying its speed ratio, the axis of the driven member of one train being parallel to and displaced from the axis of the driving member of the other train, and toothed gearing, additional to the gearing of the gear trains themselves, connecting together said driven and driving members.

3. Variable speed torque converting power transmission mechanism comprising at least two epicyclic gear trains each having a single driving member and a single driven member and means for varying its speed ratio, the axis of the driven member of one train being in the same plane as but displaced angularly from the axis of the driving member of the other train, and toothed gearing, additional to the gearing of the gear trains themselves, connecting together said driven and driving members.

JAMES EDWARD FREEBORN.